United States Patent [19]

Jaeger

[11] 4,061,493
[45] Dec. 6, 1977

[54] METHOD FOR REMOVING UNDESIRED ELEMENTS, PARTICULARLY H₂ AND O₂, IN ELECTROSLAG REMELTING AND AN ARRANGEMENT FOR CARRYING OUT THE METHOD

[75] Inventor: Heimo Jaeger, Bruck an der Mur, Austria

[73] Assignee: Vereinigte Edelstahlwerke Aktiengesellschaft (VEW), Vienna, Austria

[21] Appl. No.: 726,190

[22] Filed: Sept. 24, 1976

Related U.S. Application Data

[63] Continuation of Ser. No. 580,798, May 27, 1975, abandoned.

[30] Foreign Application Priority Data

May 28, 1974 Austria ................... 4376/74

[51] Int. Cl.² ........................... C22B 4/00; H05B 7/18
[52] U.S. Cl. .................... 75/10 C; 13/9 ES; 75/10 R
[58] Field of Search ................ 75/10-12; 164/52, 252, 50, 250; 13/9

[56] References Cited

U.S. PATENT DOCUMENTS

| | | | |
|---|---|---|---|
| 3,571,475 | 3/1971 | Holzgruber | 75/10 R |
| 3,744,989 | 7/1973 | Doenecke | 75/10 R |
| 3,767,831 | 10/1973 | Plockinger | 75/10 R |

*Primary Examiner*—Peter D. Rosenberg
*Attorney, Agent, or Firm*—Toren, McGeady and Stanger

[57] ABSTRACT

An electroslag remelting or refining method and arrangement for removing undesired elements, particularly H₂ and O₂, from metals. A water-cooled mold having a bottom plate is adapted to being raised in known manner. A growing metal ingot solidifying in the mold has a solidified portion and a liquid metal sump portion. A layer of molten slag covers the liquid metal sump. A self-consuming electrode extends into the slag. An a.c. source is connected between the electrode and bottom plate. Oppositely-poled auxiliary electrodes are included which are in electrical contact with the slag cover, the auxiliary electrodes being connected to opposite polarity terminals of a d.c. source.

12 Claims, 5 Drawing Figures

METHOD FOR REMOVING UNDESIRED ELEMENTS, PARTICULARLY H₂ AND O₂, IN ELECTROSLAG REMELTING AND AN ARRANGEMENT FOR CARRYING OUT THE METHOD

This is a continuation of Application Ser. No. 580,798 filed May 27, 1975, and now abandoned.

BACKGROUND OF THE INVENTION

The present invention relates to an electroslag remelting or refining process and more particularly, a method and arrangement for enhancing impurity removal for such process.

A method for the production of ingots from high-melting metals, particularly steel, is already known as described in U.S. Pat. No. 3,571,475 to Holzgruber et al, issued Mar. 16, 1971. In that disclosure, fusion electrolysis, during the melting of at least one self-consuming electrode by alternating current in an electrically conductive liquid slag (the so-called electroslag remelting or refining method), is used to control the direction of metallurgical reactions and to remove undesired elements like sulfur, oxygen, etc. from the melt. The principle utilized there is that the slag, which is present in the molten state in the remelting system, is ionized to a great extent due to the joulean heat generated during the passage of the current. Further, the individual ions are moved in the slag by the superposition of a direct current.

In electroslag remelting or refining with alternating current, the polarity of the consumable electrode and of the liquid slag changes periodically according to the polarity of the a.c. source. When the electrode pases, for example, through the positive half wave, the ingot sump forms the negative pole. By means of at least one non-melting auxiliary electrode, which consists preferably of graphite, a d.c. component is introduced into the remelting system by way of rectifiers so that both the electrode and the ingot have a positive (or negative) potential difference relative to the auxiliary electrode. In this manner, it is possible to start a fusion electrolysis which results in ionic migration to the auxiliary electrode, on the other hand, and to the self-consuming electrode and to the sump, on the other. Depending on the polarity of the auxiliary electrode, certain ions will discharge on the auxiliary electrode and be deposited after reactions with the electrode graphite or atmospheric oxygen. This enhances reactions particularly between the steel and slag phase.

According to this known method it is possible, for example, to increase the desulfurization of steel, where the following reactions take place:

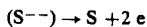

$(S^{--}) \rightarrow S + 2e$ $S + S \rightarrow S_2$

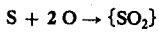

$S + 2 O \rightarrow \{SO_2\}$

The velocity of these reactions is higher with higher migration velocity of the ion. The lower limit of the electromotive force Uo moving the ions can be calculated from the quantities. ΔH, T, ΔS and $n$, which are typical of the above described reactions. ΔH is the amount of heat in cal/mol used up or released in the course of such a reaction. ΔS is the entropy change in the course of a chemical reaction in cal/°C. Mol. T is the absolute temperature in °K. $n$ is the number of reacted elementary charges per molecule or ion.

The term $\Delta H_o - T \cdot \Delta S = \Delta G_o$ is the free standard reaction enthalpy and denotes the energy that is expanded in the course of a chemical reaction.

F is the Faraday constant which indicates the amount of current that is necessary to deposit $1/n$ mole $(=1$ val).

$F = 96,500 \text{ (coulomb)} = 26.6 \text{ Ampere-hours-(Ah)}$

The d.c. voltage $U_G$ required for the electrolytic treatment of the slag in electroslag-remelting results generally from the equation $$U_G = U + J \cdot R$$

where
U is the theoretical electromotive force (emf) required to activate the chemical process and is calculated from $$\Delta G = \Delta G_o + R \cdot T \cdot \ln K = - n \cdot F \cdot U$$

from which we obtain $$U = R \cdot T/n F \cdot \ln K = \Delta G_o/n \cdot F$$

furthermore we have $$U_o = \Delta G_o/n \cdot F$$

and $$R = U_G/J = \rho \cdot 1/f \text{ ohm}$$

where
$\rho$ is the specific resistance of the slag bath in ohm-centimeters.
1 is the distance of the electrodes in the slag in centimeters.
$f$ is the effective electrode surface in square centimeters.
$K$ is the characteristic from the law of mass action for the respective reaction.
$n$ is the charge number.
$U_o$ is the basic emf (V).

As mentioned above, the auxiliary electrode has previously been used only as an anode (or cathode), while the melting electrode or the phase boundary slag-sump served as the opposing poles or (antipoles). Reactions could therefore practically only be started on the non-consuming auxiliary electrode, since the current density was too low at the antipoles, and if reactions took place, tthe deposited reaction products were again introduced into the remelting system by the melting of the electrode.

While in the presently used methods, the undesired components like $S^{2-}$, $O^{2-}$, $N^-$, $OH^-$ could be deposited with the auxiliary electrode poled as an anode (which led to an improvement of the desulfurization, prevention of Si— oxidation and decomposition of nitrogen), an effective decomposition of hydrogen in the form of $H^1$ can only be achieved with the auxiliary electrode poled as a cathode.

SUMMARY OF THE INVENTION

It is an object of the present invention to provide, in electroslag remelting, at least two oppositely poled auxiliary electrodes, to effect fusion electrolysis, so that both anions and cations can be deposited simultaneously on the auxiliary electrodes.

It is another object of the present invention to provide a new arrangement and method, in electroslag remelting, wherein substantial improvement is obtained in the purity of the ingots.

It is a further object of the present invention to provide a new arrangement and method, in electroslag remelting, wherein substantially fewer distributions of resulting occlusions in the ingot is obtained.

It is still a further object of the present invention to provide oppositely poled auxiliary electrodes in an electroslag remelting using gaseous plasma to make electrical contaccct with the slag.

In accordance with the present invention, an electroslag remelting method for removing undesired elements from a metal, particularly $H_2$ and $O_2$, includes the steps of applying an a.c. voltage between at least one self-consuming electrode and a mold containing a growing ingot, melting the self-consuming electrode in a liquefied, electrically conductive slag and solidifying the melt in a water-cooled mold. The method also comprises supplying and superposing d.c. current by the use of two differently poled auxiliary electrodes which are in electrical contact with the slag, the d.c. current flowing between the auxiliary electrodes, the self-consuming electrode and the ingot, wherein the self-consuming electrode and the ingot is also oppositely poled. Finally included is the step of removing the undesired elements by fusion electrolysis, the undesired elements, which are present in the slag in the form of ions, migrating to the auxiliary electrodes and the self-consuming electrodes. The undesired elements are removed by chemical reaction with the air, the slag and the material of the auxiliary electrodes.

Also in accordance with the present invention, an electro-slag remelting arrangement for removing undesired elements, particularly $H_2$ and $O_2$, includes at least one self-consuming electrode, a water-cooled mold affixed to a bottom plate, an a.c. source connected between the electrode and bottom plate, a growing metal ingot solidifying in the mold having a solidified portion and a liquid metal sump portion and a molten slag cover extending over the liquid metal sump. The arrangement also comprises oppositely-poled auxiliary electrodes which are in electrical contact with the slag cover. The auxiliary electrodes are connected to opposite polarity terminals of a d.c. source.

For a better understanding of the present invention together with other objects thereof, reference is made to the drawings and following description while the scope of the invention is pointed out in the appended claims.

DETAILED DESCRIPTION OF THE INVENTION

Figure 1:
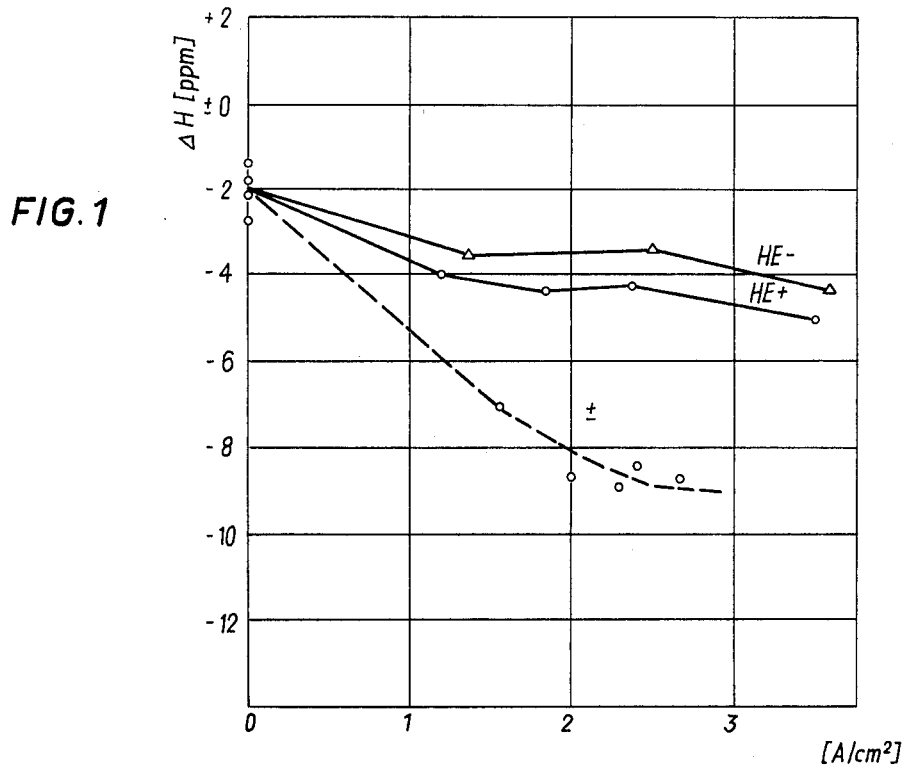
FIG. 1 is a graphical illustration of the improved results of the present invention in contrast with either polarity phasing of the auxiliary electrode using known methods.

The invention is directed to the use of two oppositely-poled auxiliary electrodes for effecting fusion electrolysis so that both anions and cations can be deposited on the auxiliary electrodes simultaneously.

During tests performed in developing the present invention, it was found that the lime content of the slag has a great effect on the variation of the hydrogen content during the remelting. The higher the CaO content of the slag is under otherwise equal conditions, the greater is the prevention for the release of hydrogen. High CaO-contents can even cause an increase of the hydrogen content in the ingot relative to the melting or self-consuming electrode with corresponding contents of atmospheric hydrogen. Tests have shown that under otherwise equal conditions, a decrease of the hydrogen content is achieved both with positive and with negative poling of the auxiliary electrode, since hydrogen occurs both as a H+ and as a OH− ion.

EXAMPLE

The following example is illustrative

A steel electrode with a hydrogen content of 7 ppm, a carbon content of 2.1%, and a chromium content of 12%, was remelted in an atmosphere with a water content of 10 g/Nm3. The above mentioned $H_2$-increase was already observed with a current density $O$ at the auxiliary electrode, this state corresponding to pure a.c. remelting with the auxiliary electrode poled as an anode: an $H_2$-decrease was observed with rising current density, starting from a current density of about 1.3 A/cm². An increase of the current density to more than 5 A/cm² had no further effect. If the auxiliary electrode had a negative polarity relative to the melting electrode, $H_2$ was similarly decomposed in the melt within a current density range of 0.5 to 4 A/cm², though to a lesser extent. The maximum additional hydrogen release was here 7 ppm with a superposed current density of 3 A/cm², compared to pure a.c. remelting. This applies to a mold diameter of 90 mm and a diameter of the melting electrode of 40 mm, which was melted at a rate of 30 kg/g. The CaO content of the slag was 30%. The slag consisted of one third each of alumina, lime and fluorite. The remelting was effected with an a.c. voltage of 35 V and a current density of 65 A/cm² on the melting electrode.

This result shows thus that the electrolytic removal of hydrogen from the melt can be achieved both with positive and with negative poling of the auxiliary electrode with either H+ or OH− ions being deposited, depending on the polarity.

With the auxiliary electrode poled as an anode, OH− ions are discharged according to the following equation:

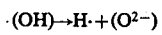

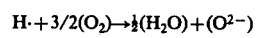

or

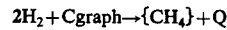

Q=heat tone in Kcal/mols.

The hydroxyl-ion is thus discharged, and after reactions with the oxygen formed or with the electrode graphite, is removed from the remelting system as water vapor hydrocarbon.

On the cathode (melting electrode or sump) solution or ionization of hydrogen or oxygen dissolved in the electrode, $$O + 2e^- \rightarrow (O^{2-})$$

$$O + H + e^- \rightarrow (OH^-)$$

is possible.

If the auxiliary electrode is negatively poled, the H+ ions can be deposited according to $$(H^+) + e^- \rightarrow H\cdot$$

The hydrogen gas formed can react either with the atmospheric oxygen according to the oxyhydrogen gas explosion.

$$H_2 + \tfrac{1}{2}O \rightarrow H_2O$$

or again with the electrode graphite.

Figure 2:
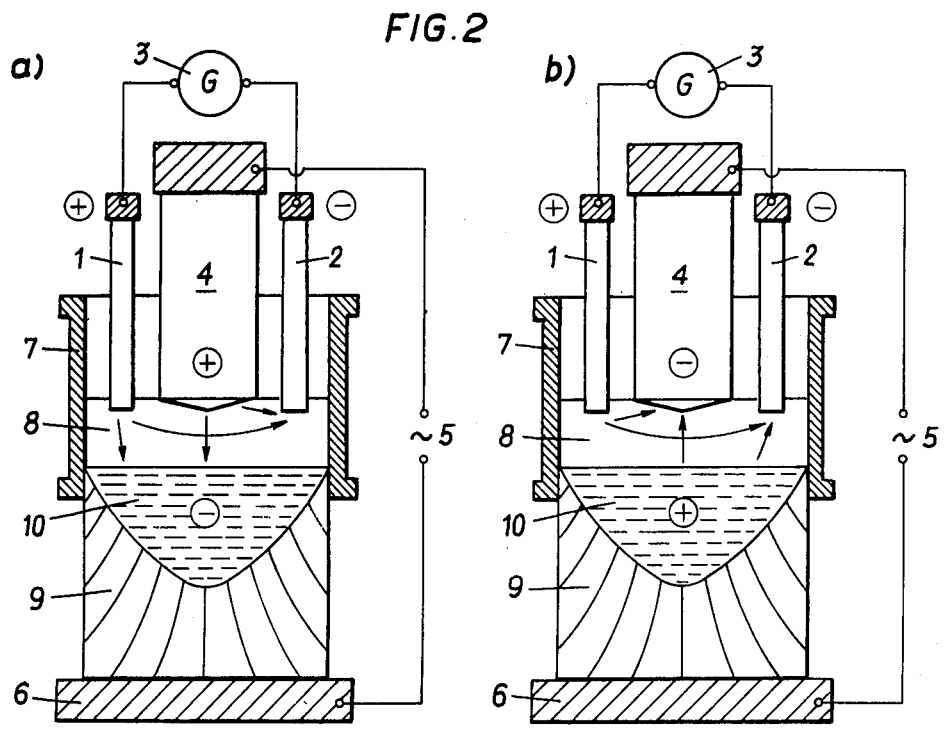
FIG. 2a is a schematic representation of the present invention for one d.c. polarity arrangement.
FIG. 2b is a schematic representation of the present invention for the opposite d.c. polarity arrangement.

The assumption that hydrogen exists as a proton and hydroxy-ion is strengthened by the results shown in FIG. 1. These results were obtained with the arrangement represented in FIG. 2. By using two differently poled auxiliary electrodes 1 and 2, which are supplied by a d.c. generator 3, we can obtain a simultaneous + − electrolysis according to the foregoing equations. The melting or self-consuming electrode is designated by 4 in this arrangement. It is connected to the a.c. source 5 which is also connected to the bottom plate 6. 7 denotes the water-cooled mold which can be raised using known means (not shown). 8 denotes the molten slag cover, 9 the solidified part of the growing ingot, and 10 the liquid metal sump. The auxiliary electrodes 1 and 2 may consist of graphite, or of iridium-coated copper which is provided with water channels for cooling.

Both types of hydrogen-ions can be deposited simultaneously in such an electroslag remelting system. The broken curve in FIG. 1, which represents the decrease of the hydrogen content in ppm in the + − electrolysis, shows corresponding greater reductions of the hydrogen content than the solid curves HE− and HE+ which show the hydrogen decreasing with negative or positive poling of a single auxiliary electrode, as in the known method.

The results shown in FIG. 1 were obtained for a steel with a hydrogen content of 13-15 ppm. Furthermore, the steel contained 0.05% C, 18% Cr and 9% Ni. The mold diameter was 30 mm, the diameter of the melting electrode 40 mm. A slag consisting of 40% lime, 40% alumina and 20% fluorite was used. The melting conditions were the same as in the foregoing example.

Since the carbon content of the ingot is increased when the auxiliary electrode dips into the slag with the application of higher current densities, an arrangement is shown to transmit the d.c. energy in the form of plasma to the slag. To this end, the auxiliary electrode is made tubular and a plasma-forming gas, preferably argon, is passed through, so that a plasma-arc is formed between the auxiliary electrode and the slag. This embodiment of the invention leads to a reduction of the graphite consumption and improved the separation of gaseous deoxidation products further. The surface of the graphite electrodes is preferably protected by a coating with a high-alumina mortar against erosive slag vapors. The mortar consisted substantially of about 90% alumina silicate and waterglass as a binder. The coating prevents the formation of graphite soot with the resulting carbonization of the melt. Such a coating is naturally also possible and advisable in compact graphite electrodes.

The d.c. plasma flame, which prevents direct contact between the auxiliary electrode and the slag, permits, just like a dipping electrode, electrolytic reactions between the ionized slag and the liquid metal film at the tip of the melting electrode, the atmosphere and the auxiliary electrode. The arc length is 1–5 cm, depending on the superposed voltage.

The greater distance between the auxiliary electrode and the slag and also the reduction of the oxygen-partial pressure above the slag by argon and the cooling effect of the rare gas in the bored auxiliary electrode reduce its oxidation. Since the partial pressure of all other gases above the slag is similarly reduced by the rare gas, its separation is, in addition, facilitated and enhanced during the remelting. This applies to $SO_2$, gaseous $S_2$, $O_2$, $H_2O$ vapor and HF.

Furthermore, it is possible by the application of plasma superposition to considerably reduce the hydrogen content of the remelted ingot relative to that of the consumable electrode, even with the lower $H_2$ contents of the electrode. With a hydrocarbon content of the electrode of 10.5 ppm, a hydrogen content of 2.5 ppm in the ingot could be obtained. With a hydrogen content of the electrode of 2.8 ppm, the hydrogen content in the ingot could be reduced to 1.3 ppm.

Furthermore, the plasma flame serves to additionally heat the slag. This has the advantage, for example, of a more uniform temperature distribution in the slag bath with a flatter sump, which results in better solidification conditions. The total energy consumption for remelting is also reduced. Since metallic aluminum is present by the electrolytic reaction in finely divided form at the phase boundary metal-slag, nonmetallic lime alumina occlusions are similarly formed in fine dispersion.

If argon is used as a plasma-forming gas, an additional result is a certain protective gas effect, which is of importance in the remelting of steels with contents of high-oxygen affinity elements (Ti, Al, Zr, CeLa etc.).

Figure 3:
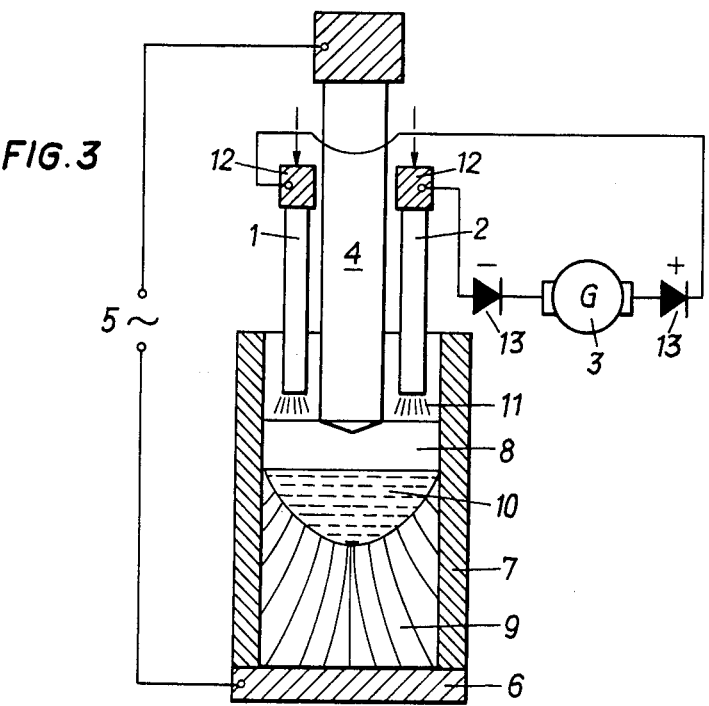
FIG. 3 is a schematic representation of the present invention illustrating plasma contact between oppositely-poled auxiliary electrodes and the slag.

FIG. 3 shows a device according to the invention where the auxiliary electrodes do not dip into the slag bath, but the electrical contact between the slag and the auxiliary electrode is established by two plasma arcs 11. The gas put through was, in this special case, 10 - 50 liters of argon/min. and the ratio of the diameter of the auxiliary electrode to the diameter of the bore was 7:1. The plasma arec is ignited by initial contact between the auxiliary electrodes and the slag, after which the auxiliary electrodes are raised by known means so that only the melting electrode dips into the slag bath. Because of the melting of the electrode, the steel and slag level rises in the mold.

The supply of plasma-forming gas is effected at the points designated by element 12. The superposed current intensity is kept constant by the thyristor-controlled regulation of the rectifiers. The d.c. voltage depends on the length of the arc. The current density at the auxiliary electrodes is effective in the range of about 1.5 - 5 A/cm². The d.c. energy should preferably be 10 − 30% of the a.c. energy. By direct current in the sense of this disclosure, intermittent or pulsating direct current is also understood.

Since the electrolytic reactions only start at a certain threshold voltage (the desired threshold values are in a certain range of the bath voltage, which varies from case to case), the superposed voltage must be regulatable. Due to the separately arranged d.c. source 3 (which can be, for example, a welding generator), both the superposed current intensity and the superposed d.c. voltage can be varied within wide limits. In order to shield the d.c. circuit from the a.c. circuit, rectifiers 13 can be arranged as filter sections in front of both poles of generator 3.

Figure 4:
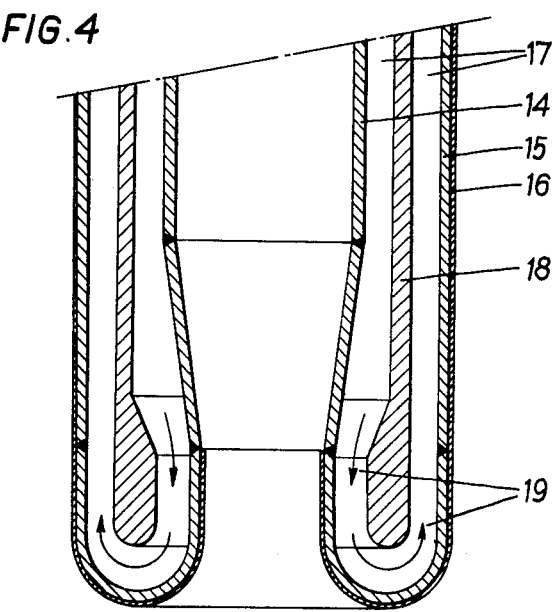
FIG. 4 is a cross-sectional representation of an embodiment of the auxiliary electrodes of the present invention.

FIG. 4 shows another possibility for designing the auxiliary electrodes 1 and 2. An inner copper tube 14 and an outer copper tube 15 are provided with an iridium coat. A water pipe 18 with cooling water channels 17 is used for cooling. The arrows 19 indicate the direction of flow of the cooling water. The supply of plasma-forming gas can be effected through the duct 20.

The subject of the present invention is therefore a method for removing undesired elements, particularly $H_2$ and $O_2$, in electroslag remelting or refining, where at least one self-consuming electrode is melted with alternating current in a liquified electricaly conductive slag and the melt thus formed is made to solidify in a water-cooled mold according to the principle of the growing ingot. Superposed currents are generated in the slag by means of at least two differently poled non-melting auxiliary electrodes connected to at least one d.c. source between the auxiliary electrodes and the remelting electrode, on the one hand, and the auxiliary electrodes and the ingot, on the other. In addition, alternating current flows in known manner between the remelting electrode and the ingot. This results, by utilization of fusion electrolysis, in a migration of the undesired elements, which are present in the form of ions, to the auxiliary electrodes and in the removal of these elements from the melt by chemical reactions with the air, the slag, or the material of the auxiliary electrodes.

The invention also encompasses arrangements for carrying out ythe method. an improvement of the purity of the ingots by electroslag remelting is obtained and a finer distribution of the remaining occlusions results.

While the foregoing specification and drawing represent the preferred embodiments of the present invention, it will be obvious to those skilled in the art that various changes and modifications may be made therein without departing from the true spirit and scope of the present invention.

What is claimed is:

1. In an electroslag remelting method for removing undesired elements from a metal, including the steps of applying an a.c. voltage between at least one self-consuming electrode and a mold containing a growing ingot, melting said self-consuming electrode in a liquidifed, conductive slag and solidifying the melt in a liquid-cooled mold, the improvement comprising the steps of:

applying a voltage of a certain first magnitude to one non-fusing auxiliary electrode and a voltage of a magnitude different from said first magnitude to another non-fusing auxiliary electrode which are in electrical contact with said slag for creating a d.c. current flow in the slag; and removing the undesired elements by fusion electrolysis, said undesired elements which are present in the slag in the form of ions, migrating to said auxiliary electrodes and said self-consuming electrodes, wherein the undesired elements are removed by chemical reaction with the air, the slag and the material of the auxiliary electrodes.

2. The method of claim 1, wherein the current density of the auxiliary electrodes is up to 5.5 A/mps/cm$^2$ and the d.c. energy flowing is 10–30% of the a.c. energy.

3. In an electroslag remelting arrangement for removing undesired elements, of the type including at least one self-consuming electrode, a liquid-cooled mold affixed to a bottom plate, an a.c. source connected between said electrode and bottom plate, a growing metal ingot solidifying in said mold having a solidified portion and a liquid metal sump portion, and a molten slag cover extending over said liquid metal sump, the improvement comprising oppositely poled auxiliary electrodes which are in electrical contact with said slag cover, each of said auxiliary electrodes being connected to respective opposite polarity terminals of a d.c. source for creating a d.c. current in the slag.

4. An arrangement according to claim 3, wherein the auxiliary electrodes and the self-consuming electode dip into the molten slag.

5. An arrangement according to claim 3 wherein the self-consuming electrode is positively poled with respect to the ingot.

6. An arrangement according to claim 3 wherein the self-consuming electrode is negatively poled with respect to the ingot.

7. An arrangement according to claim 3 wherein the d.c. current and a.c. circuit are made independent from each other by rectifiers which are arranged as filters in series with both poles of the d.c. source.

8. An arrangement according to claim 3 wherein the differently poled auxiliary electrodes consist of graphite.

9. An arrangement according to claim 4 wherein the differently poled auxiliary electrodes are tubular, and a plasma-forming gas is passed therethrough, electrical contact between the auxiliary electrodes and the slag cover being maintained by a plasma arc.

10. An arrangement according to claim 8 wherein the surfaces of the graphite electrodes are coated with a high alumina mortar of about 90% silicate and waterglass as a binder.

11. An arrangement according to claim 3 wherein the differently poled auxiliary electrodes are composed of iridium coated copper, which are provided with water channels for cooling.

12. An arrangement according to claim 9 wherein said tubular auxiliary electrodes comprise an inner copper tube and a concentric outer copper tube, which tubes are provided with an iridium coating, between which is arranged a cooling water conduit, the tubes defining a cooling water channel leading first upwardly and then downwardly, said electrodes having a duct for the supply of plasma-forming gas.

* * * * *